United States Patent
Mohi et al.

(10) Patent No.: US 6,400,563 B1
(45) Date of Patent: Jun. 4, 2002

(54) MULTI-DRIVE PORTABLE COMPUTER HAVING A PLURALITY OF HEAT SINK MEMBERS THEREIN

(75) Inventors: Pasha S. Mohi, Houston; Chris F. Felcman, Spring; Neil L. Condra, The Woodlands; Gregory J. Mora, Tomball; Stacy L. Wolff, Houston, all of TX (US); Chi-Tsong Chu, Taipei (TW)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/654,711

(22) Filed: Sep. 1, 2000

Related U.S. Application Data (62) Division of application No. 08/999,438, filed on Dec. 29, 1997, now Pat. No. 6,134,104.

(51) Int. Cl.[7] .............................. G06F 1/16; H05K 7/20
(52) U.S. Cl. ...................... 361/683; 361/683; 361/695; 361/707; 165/122; 165/125; 369/75.2; 369/82
(58) Field of Search .................................. 361/687, 683, 361/690, 695, 704, 707; 165/122–126; 369/75.1, 75.2, 76, 77.1, 77.2, 78, 79, 80, 81, 82

(56) References Cited

U.S. PATENT DOCUMENTS

| | | | |
|---|---|---|---|
| 5,132,947 A | * 7/1992 | Kameda et al. | 369/75.1 |
| 5,229,900 A | * 7/1993 | Arai et al. | 369/77.2 |
| RE34,369 E | * 9/1993 | Darden et al. | 369/75.1 |
| 5,475,563 A | 12/1995 | Donahoe et al. | 361/695 |
| 5,568,360 A | 10/1996 | Penniman et al. | 361/687 |
| 5,581,443 A | * 12/1996 | Nakamura et al. | 361/687 |
| 5,598,320 A | 1/1997 | Toedtman et al. | 361/687 |
| 5,646,820 A | 7/1997 | Honda et al. | 361/683 |
| 5,649,750 A | 7/1997 | Ishii et al. | 312/223.2 |
| 5,689,400 A | 11/1997 | Ohgami et al. | 361/683 |
| 5,694,294 A | * 12/1997 | Ohashi et al. | 361/687 |
| 5,715,139 A | 2/1998 | Nakajima | 361/683 |
| 5,729,431 A | 3/1998 | Marwah et al. | 361/687 |
| 6,043,977 A | * 3/2000 | Nakajima | 361/687 |
| 6,072,696 A | * 6/2000 | Horii | 361/695 |

\* cited by examiner

Primary Examiner—Darren Schuberg
Assistant Examiner—Lisa Lea-Edmonds (57) ABSTRACT

A notebook computer base housing has operatively disposed therein a CD ROM drive, a hard disk drive and a floppy disk drive, an AC/DC electrical power converter, a modem, a PCMCIA card bay structure and a battery. This internal provision of three drive units in addition to the other equipment within the base housing is facilitated from a space standpoint by the vertical stacking of the hard disk drive atop the CD ROM drive within the base housing. To dissipate the operating heat from these components within the base housing, a heat spreader plate is interposed between the CD ROM drive and the overlying hard disk drive, and the high heat-generating components—namely, the modem, the AC/DC converter, the PCMCIA card bay structure, and the computer processor—are closely grouped together, with the AC/DC converter in thermal communication with a second heat spreader plate. The processor is disposed above the other high heat-generating components on a horizontally oriented main system circuit board with the circuit board having top and bottom side heat sink members thermally communicated with the processor. An axial fan disposed in the base housing creates an upper flow of cooling air that passes over the upper heat sink member, and a lower flow of cooling air that passes over the lower heat sink member and the heat-generating components grouped below the processor.

35 Claims, 5 Drawing Sheets

MULTI-DRIVE PORTABLE COMPUTER HAVING A PLURALITY OF HEAT SINK MEMBERS THEREIN

This application is a division of Ser. No. 08/999,438 filed Dec. 29, 1997 now U.S. Pat. No. 6,134,104.

BACKGROUND OF THE INVENTION

1. Field of the Invention

The present invention relates generally to portable computers and, in a preferred embodiment thereof, more particularly relates to a portable notebook computer having operatively disposed in its base portion three drive units—a floppy disk drive, a hard disk drive and a CD ROM drive—in addition to an internal modem and AC/DC adapter, a dual PCMCIA card bay, and a battery.

2. Description of Related Art

Small portable computers, such as the increasingly popular notebook computer, continue to become more sophisticated, powerful and more like their larger desktop counterparts in terms of overall versatility of use. As it has evolved, the notebook computer typically comprises a generally rectangular base housing with a keyboard and pointing device mounted on its top side. A lid housing is hinged to a rear top side edge portion of the base housing for pivotal movement relative thereto between (1) a closed storage and transport orientation in which the lid extends across and covers the top base housing side, and (2) an upwardly pivoted use orientation in which a the keyboard and pointing device are exposed, and a display screen in the inner side of the lid housing faces the user of the computer.

The base housing of a conventional notebook computer is of a generally rectangular configuration and typically has a left-to-right length of approximately 11"; a front-to-rear width of approximately 9"; and a vertical thickness of approximately 1.5". Compared to the volume within a typical desktop computer housing, the volume within a notebook computer base housing is extremely small. Yet it within this diminutive interior space that the various electronic components of the notebook computer—such as its hard drive, system board, processor and the like—must be operatively disposed.

Compared to desktop computers, early notebook computers were noticeably slower and had considerably less operational versatility. For example, their processors tended to be slower and their hard drive storage capacities were lower. Additionally, the conversion of AC electrical power supplied to the computer to the necessary DC electrical power for use by the computer was accomplished by a bulky exterior converter "brick" which had to be carted around as a needed accessory for the notebook computer.

As computer designers became more skilled at operatively placing more components into the cramped interior confines of the notebook computer base housing, the notebook computer began to approach the desktop computer in terms of speed, capacity and operational flexibility. For example, later notebook computers were typically provided with both an internal hard disk drive, an internal floppy disk drive and, in some instances, an internal AC/DC converter. Later, as the incorporation of CD ROM drives became prevalent in desktop computers, it became desirable to also internally incorporate a CD ROM drive into the base housing of a notebook computer.

However, at this point, two things had happened which forced designers to choose between the floppy drive and the CD ROM drive for internal incorporation in the notebook computer base housing along with the internal hard drive and the internal AC/DC power converter. First, there appeared to be insufficient physical room for three drive units (i.e., a hard disk drive, a floppy disk drive, and a CD ROM drive) and an internal AC/DC converter within the interior of a standard-sized notebook computer base housing. Second, as these drive units, and the computer processor, became larger and faster, their combined operational heat outputs, coupled with the operational heat of other internal components such as the internal power converter, begin to exceed the amount of heat that could be effectively dissipated from the base housing.

Accordingly, as a compromise, notebook computers were designed to give the consumer a choice of (1) an internal power converter, hard disk drive and floppy disk drive, or (2) an internal power converter, hard disk drive and CD ROM drive—in other words, only two internal drive units and an internal power converter. If the consumer ordered the internal floppy disk drive, and also wanted a CD ROM drive, the CD ROM drive had to be an external drive unit. On the other hand, if the consumer ordered the internal CD ROM drive and also wanted a floppy disk drive, the floppy disk drive had to be an external drive unit.

However, particularly to more sophisticated consumers having all three drive units in their corresponding desktop computer, this compromise is not satisfactory. Accordingly, a need exists for a portable notebook computer capable of internally incorporating in its base housing portion (1) a hard disk drive, (2) a floppy disk drive, (3) a CD ROM drive, and (4) an AC/DC power converter. It is to this need that the present invention is directed.

SUMMARY OF THE INVENTION

In carrying out principles of the present invention, in accordance with a preferred embodiment thereof, a portable computer, representatively a notebook computer, is provided which comprises a base housing having top and bottom sides, and a display screen housing secured to the base housing for movement relative thereto between open and closed positions.

First, second and third drive units, an AC/DC electrical power converter and a processor are mounted within the base housing. Representatively, the first, second and third drive units are respectively a CD ROM drive, a hard disk drive, and a floppy disk drive, with the hard disk drive being preferably mounted in a vertically stacked relationship with the CD ROM drive. Illustratively, the base housing is formed from separable top and bottom sections, with the hard disk drive being carried in an open-bottomed well portion in the top base housing section, with a heat spreader plate structure being positioned between the hard disk drive and the underlying CD ROM drive.

The processor and the AC/DC electrical power converter are adjacent one another within an interior portion of the base housing, and a cooling system is provided which is operative to create within this interior base housing portion a localized flow of cooling air which passes (1) into the base housing, (2) through the interior base housing portion and along the processor and the AC/DC electrical power converter structure and then (3) outwardly from the base housing.

Preferably, a modem and a PCMCIA card bay structure are also positioned within the same base housing interior portion as the processor and AC/DC converter, and are cooled by the same localized flow of cooling air. According to another aspect of the invention, a bottom side portion of this interior base housing portion is defined by a heat spreader structure which is in thermal communication with the AC/DC power converter structure. In accordance with another feature of the invention, a first battery is operatively disposed within the base housing, and the third drive unit is selectively replaceable with a second storage battery.

The processor is representatively mounted on a horizontally-disposed circuit board that overlies the AC/DC power converter, the modem and the PCMCIA card bay structure. Top and bottom heat sinks are respectively mounted on the top and bottom sides of the circuit board and are in thermal communication with the processor. According to another feature of the invention, in a preferred embodiment thereof, the cooling system includes an axial fan mounted in the interior base housing portion and operative to create (1) a first flow of cooling air that passes along the bottom heat sink member, the AC/DC converter, the modem and the PCMCIA card bay structure and a lower portion of the fan, and (2) a second flow of cooling air that passes along the top heat sink member and through a top portion of the fan.

In one embodiment of the invention, the top and bottom heat sink members are spaced apart from and separate from the cooling fan. In another embodiment of the invention, the top heat sink member is connected to the fan, in a heat conductive relationship therewith, and the second flow of cooling passes through the upper fan portion via an opening in the top heat sink member.

DETAILED DESCRIPTION

Figure 1:
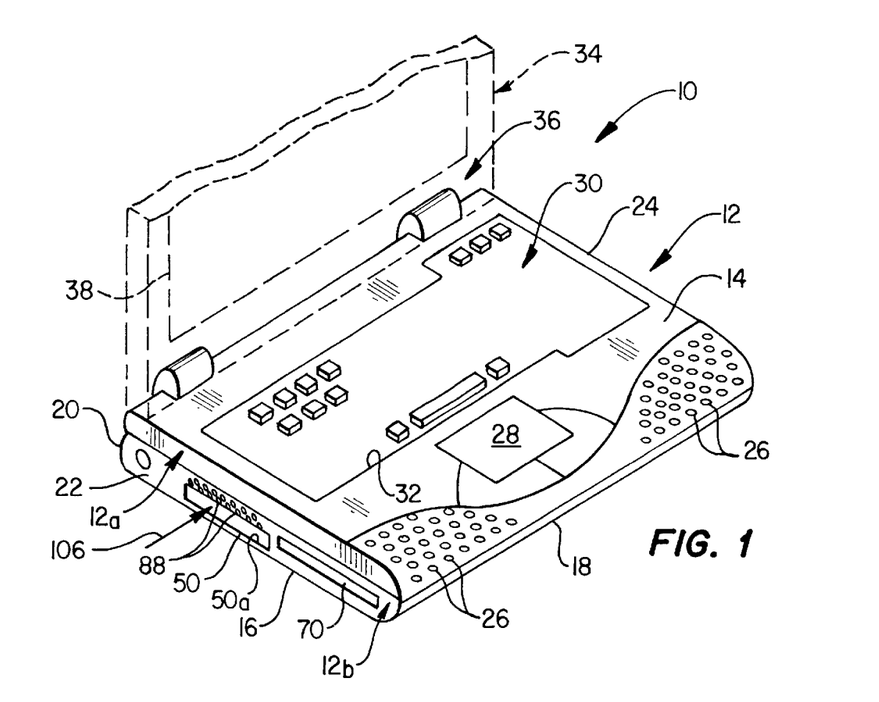
FIG. 1 is a simplified, partially phantomed perspective view of a multi-drive portable notebook computer embodying principles of the present invention.

Perspectively illustrated in simplified form in FIG. 1 is a portable notebook computer 10 which embodies principles of the present invention. Computer 10 includes a base housing 12 having a generally rectangular configuration and separable top and bottom sections 12a. Base housing 12 has top and bottom side walls 14 and 16, front and rear side walls 18 and 20, and left and right end walls 22 and 24. As used herein, the term "horizontal" means generally parallel to the top and bottom side walls 14 and 16, and the term "vertical" means generally perpendicular to the top and bottom side walls 14 and 16.

Along front corner portions thereof the top side wall 14 has speaker perforations 26, and a pointing device, representatively a touch pad 28, is centrally positioned behind the perforations 26. Behind the touch pad 28 is a keyboard assembly 30 removably retained in a complementarily configured recess 32 formed in the top side wall 14 of the base housing 12.

A lid or display housing 34 is partially shown in phantom in FIG. 1 and is secured by a hinge mechanism 36 to a rear top side edge portion of the base housing 12 for pivotal movement relative thereto between an upright use orientation (shown in FIG. 1) in which a display screen 38 on the inner side of the lid housing 34 faces the user of the computer, and a horizontal storage and transport orientation (see FIGS. 3 and 4) in which the lid housing 34 extends across and essentially covers the top side 14 of the base housing 12. A suitable latch structure (not shown) is provided for releasably holding the lid housing 34 in its horizontal storage and transverse orientation.

Referring now to FIGS. 2–5, according to a key feature of the present invention, the base housing 12 has operatively disposed therein three drive units—a CD ROM drive 40, a hard disk drive 42, and a floppy disk drive 44—and an AC/DC power converter structure 46. Additionally disposed within the base housing 12 are a modem 48, a dual PCMCIA card bay 50 and a battery 52. The card bay 50 is adapted to removably receive vertically stacked upper and lower PCMCIA cards 54 and 56 and is positioned inwardly adjacent a corresponding rectangular opening 50a formed in the left base housing end wall 22 (see FIGS. 1, 3, 5 and 6).

Figure 2:
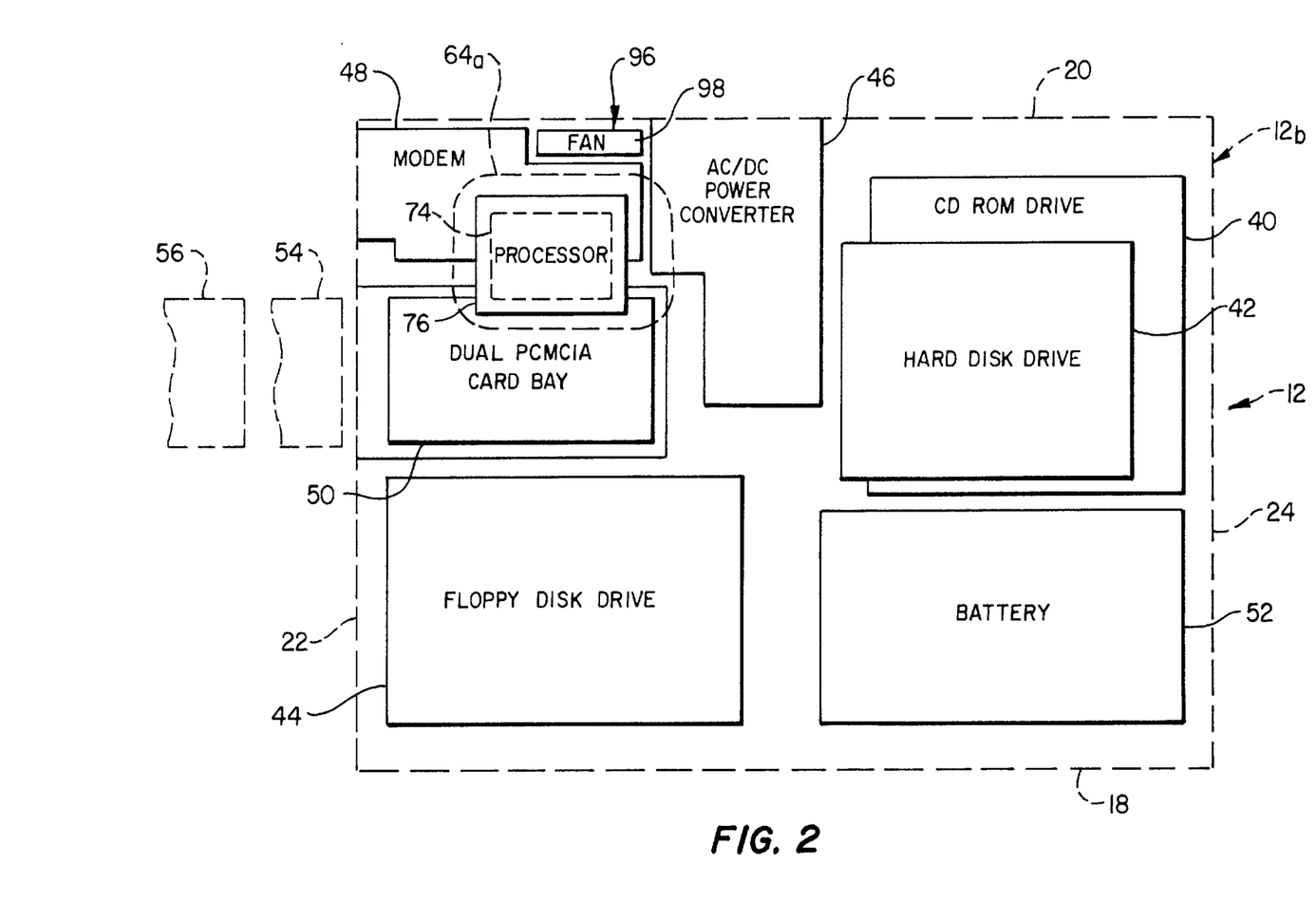
FIG. 2 is an enlarged scale partially phantomed schematic top plan view of the base housing portion of the computer showing the unique arrangement of various of its internal components.

The CD ROM drive 40 and the hard disk drive 42, in their vertically stacked relationship, are disposed generally within a right rear quadrant of the rectangularly configured base housing 12 (see FIG. 2). CD ROM drive 40 is accessible through a rectangular opening 58 in the right end wall 24 of the base housing 12 (see FIG. 4), and the hard disk drive 42 is supported on a peripheral lip portion 60 of an open-bottomed well structure 62 (see FIG 4) carried within the upper base housing section 12a.

Well structure 62 extends downwardly through a cutout area in a horizontally oriented main system circuit board 64 which is vertically disposed generally at the juncture between the separable top and bottom sections 12a, 12b of the base housing 12. Interposed between the CD ROM drive 40 (disposed in the bottom base housing section 12b) and the hard disk drive 42 (carried within the top base housing section 12a) is a horizontally oriented metal heat spreader plate 66 to which operating heat of the CD ROM drive 40 and the overlying hard disk drive 42 is transferred and dissipated during operation of the computer 10.

Figure 2A:
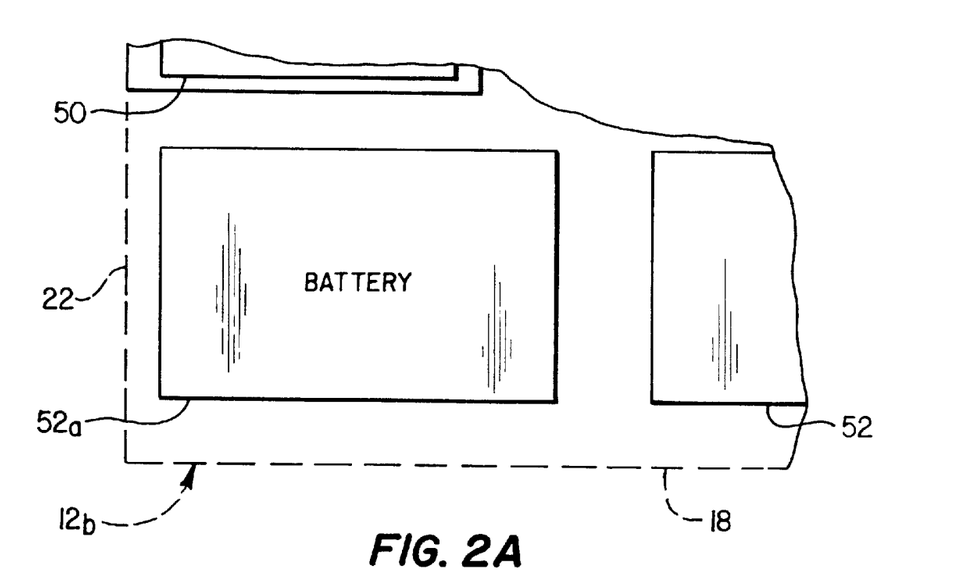
FIG. 2A is an enlarged scale partially phantomed schematic plan view of a portion of an alternate base housing embodiment of the computer.
Figure 3:
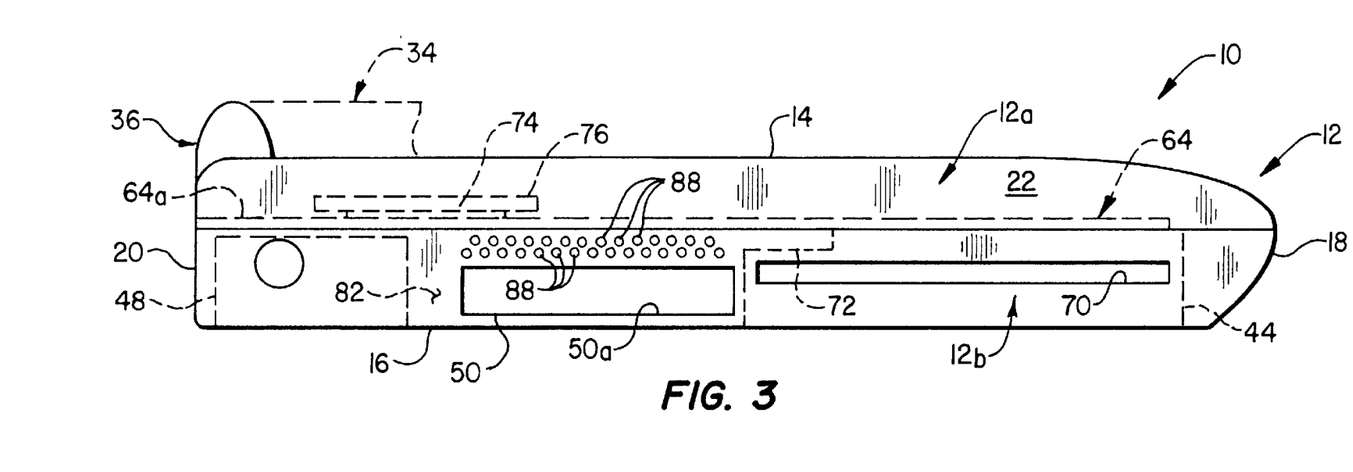
FIG. 3 is an enlarged scale simplified left end elevational view of the base housing shown in FIG. 1.
Figure 4:
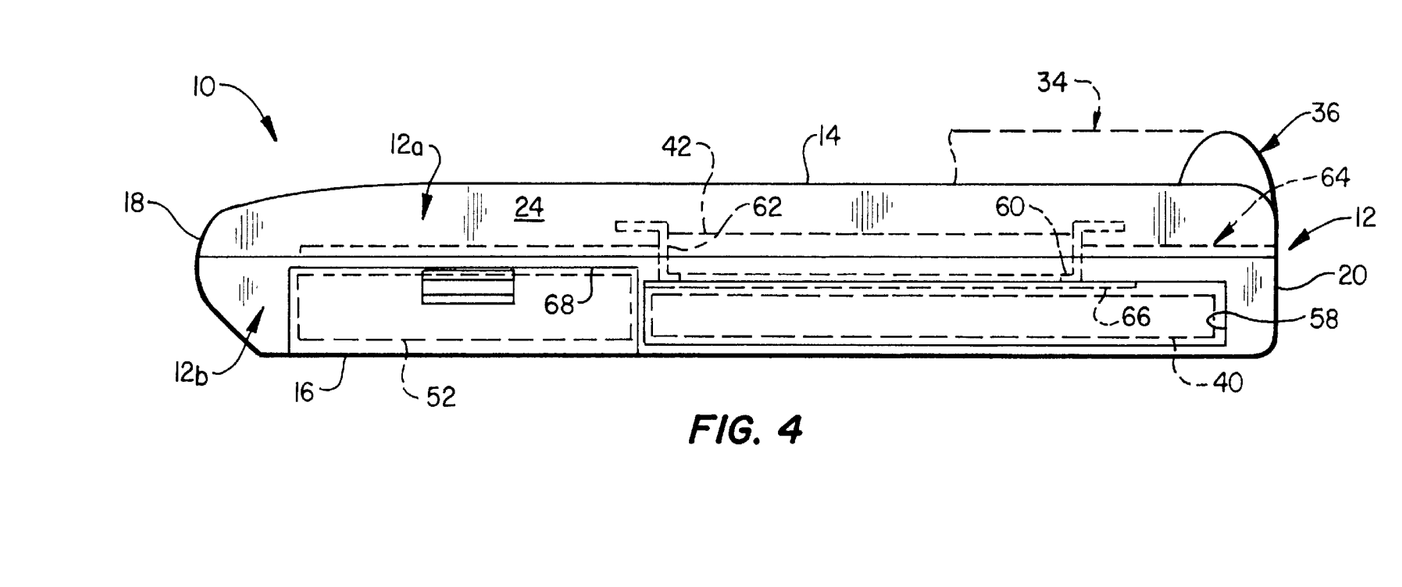
FIG. 4 is an enlarged scale simplified right end elevational view of the base housing shown in FIG. 1.

Battery 52 is disposed generally within a right front quadrant of the bottom base housing section 12b and is accessible through a corresponding opening 68 (see FIG. 4). The floppy disk drive 44 (see FIGS. 2 and 3) is disposed generally in a left front quadrant of the bottom base housing section 12b and has a horizontally elongated disk insertion slot 70 formed in the left base housing end wall 22. Floppy disk drive 44 is removably mounted within a interior base housing bay area 72 (see FIG. 3) which is configured to operatively and interchangeably accept either the floppy disk drive 44 (as schematically shown in FIGS. 2 and 3) or a second battery 52a as schematically shown in FIG. 2A.

The AC/DC power converter structure 46, the modem 48 and the dual PCMCIA card bay 50 are disposed, as schematically shown in FIG. 2, generally within a left rear quadrant of the bottom base housing section 15b beneath a left rear corner portion 64a of the horizontally oriented main system circuit board 64. A processor 74 (see FIGS. 2, 3 and 5–7) is operatively mounted on the top side of the circuit board portion 64a and is horizontally positioned generally centrally within the left rear quadrant of the bottom base housing section 12b.

A first aluminum heat sink member 76 is mounted on the top side of the processor 74 (see FIGS. 5–7) in thermal communication therewith, and a second aluminum heat sink member 78 is mounted on the bottom side of the circuit board portion 64a, under the processor 74 and is in thermal communication with the processor 74 through vias 80 (see FIG. 7) associated with the processor and extending through the circuit board portion 64a.

Figure 6:
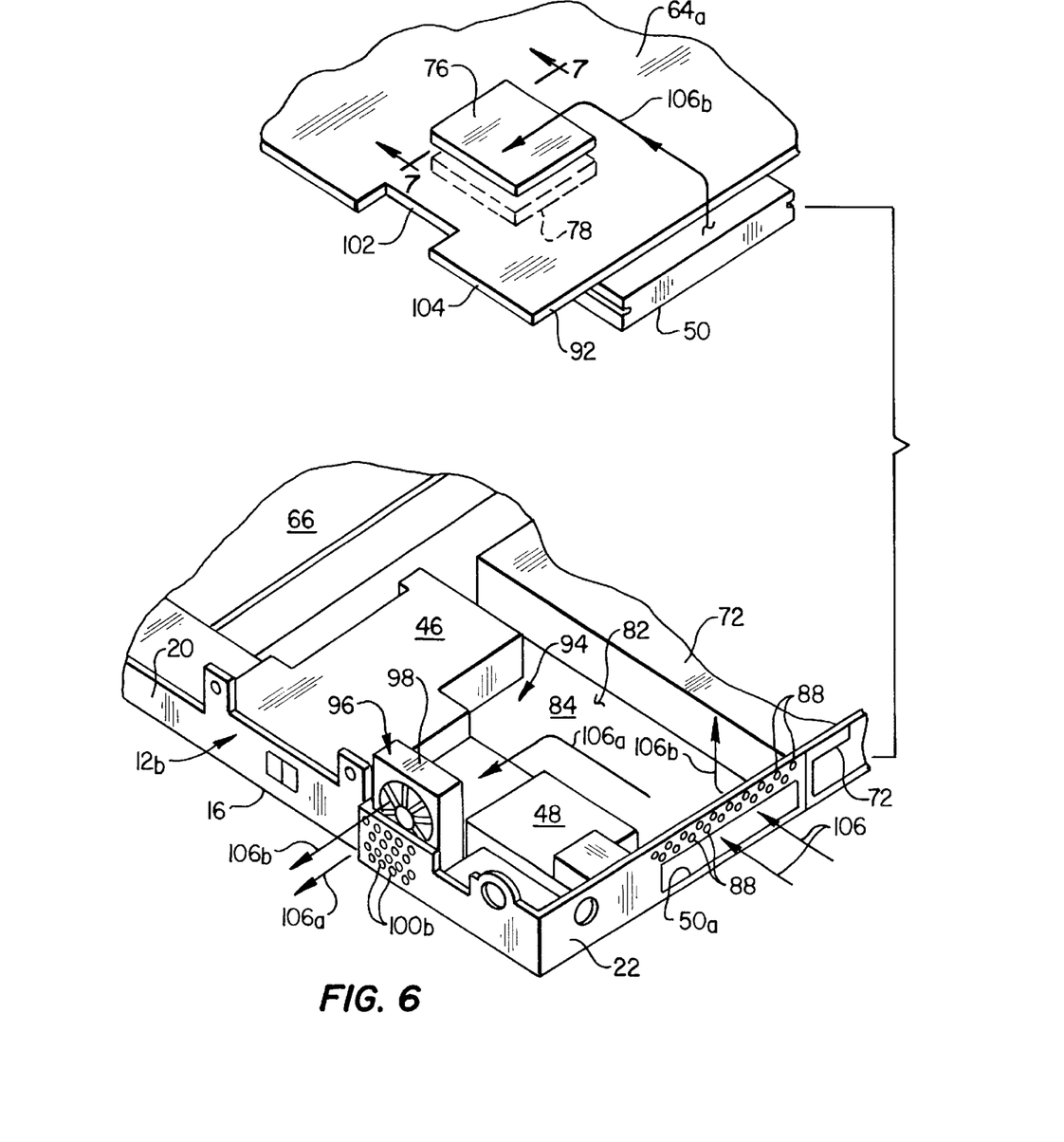
FIG. 6 is an enlarged scale simplified exploded perspective view of part of a bottom side portion of the base housing shown in FIG. 1, and an associated portion of the main system circuit board of the computer.
Figure 7:
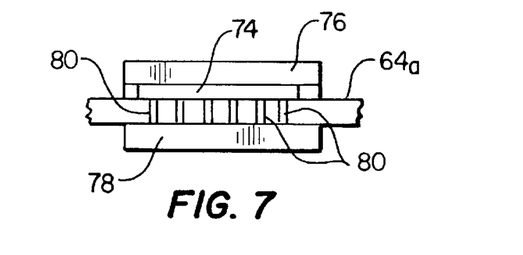
FIG. 7 is an enlarged scale schematic cross-sectional view through a heat sink and processor portion of the circuit board taken along line 7—7 of FIG. 6.

As best illustrated in FIGS. 3 and 6, a plenum area 82 is formed within the left rear quadrant portion of the bottom base housing section 12b. In general, the plenum area 82 is bounded along a top side by the corner portion 64a of the circuit board 64; bounded along a rear side by portions of the AC/DC converter 46 and modem 48; bounded along its right side by a portion of the AC/DC converter 46; bounded along its front side by the floppy drive/battery bay area 72; bounded along its left side by the left base housing end wall 22; and bounded along its bottom side by a metal heat spreader plate 84 in thermally conductive communication with the AC/DC power converter structure 46.

The PCMCIA bay structure 50 is supported on the underside of the circuit board corner portion 64a (see FIGS. 5 and 6), in a downwardly spaced relationship therewith, by posts 86, and is received within the plenum 82. A spaced series of air inlet openings 88 (see FIGS. 3, 5 and 6) are formed through the left base housing end wall 22 above the opening 50a therein, and are vertically positioned between the top side of the PCMCIA card bay structure 50 and the underside of the circuit board corner portion 64a (see FIGS. 3 and 5). For purposes later described herein, a gap 90 is left between the left side edge 92 of the circuit board 64 and the inner side of the left base housing end wall 22.

As can best be seen in FIG. 2, of the various components mounted within the portable computer base housing 12, the highest operating heat generating components—namely, the AC/DC converter 46, the modem 48, the PCMCIA card bay 50 (in which operating heat is produced by the heat-generating circuit board structures 54,56 inserted therein), and the processor 74—are closely grouped together, representatively within a left rear quadrant area of the base housing 12.

The dissipation of operating heat from these closely grouped, high heat-generating components is effectively achieved by means of a specially designed cooling system 94 (see FIG. 6) embodying principles of the present invention. Coupled with the vertical stacking of two of the drive units, representatively the CD ROM drive 40 and the hard disk drive 42, this specially designed cooling system enables the mounting of the three drive units 40,42,44 and the AC/DC converter 46 (along with the other depicted components) conveniently within the interior of the base housing 12. Accordingly, this eliminates the necessity of providing either the CD ROM drive 40, the floppy disk drive 44 or the AC/DC converter 46 as an external unit outside of the base housing 12.

The cooling system 94, as shown in FIG. 6, includes the top and bottom processor heat sinks 76 and 78; the thermally conductive heat spreader plate 84 extending along the bottom side of the plenum 82; the air inlet openings 88 formed in the left base housing end wall 22; a small axial fan 96 representatively having a rectangularly configured plastic body 98 (see FIGS. 2, 5 and 6) and a horizontally oriented discharge axis; an upper set of air discharge openings 100a (see FIG. 5) formed in the rear side wall of the top base housing section 12a directly behind an upper portion of the fan 96; and a lower set of air discharge openings 100b formed in the rear side wall of the bottom base housing section 12b directly behind a lower portion of the fan 96. As indicated in FIG. 6, a rectangular notch 102 is formed in the front side edge 104 of the circuit board portion 64a to receive a vertical rear portion of the fan body 98.

Figure 5:
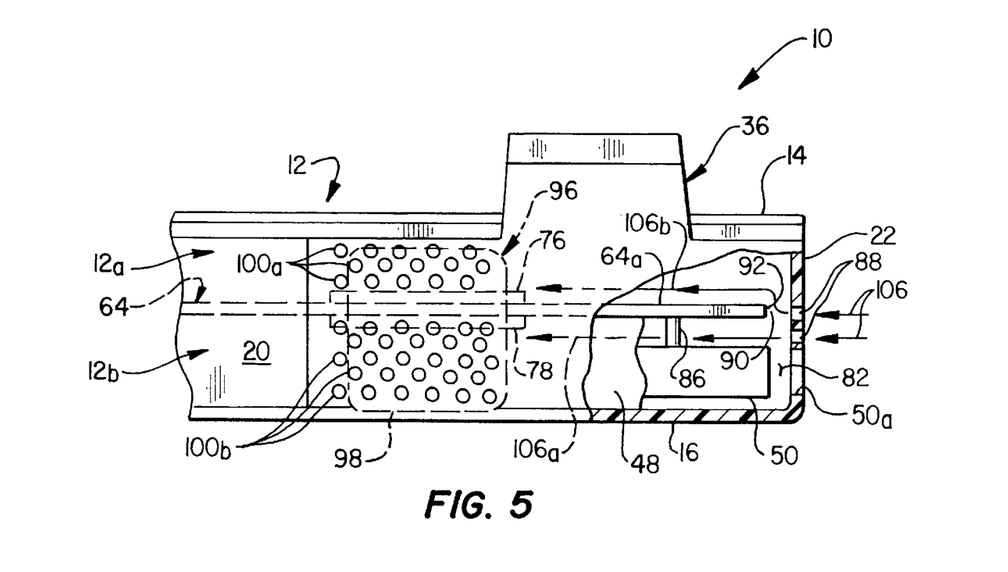
FIG. 5 is an enlarged scale simplified partial rear side elevational view of the base housing shown in FIG. 1.

Referring now to FIGS. 5 and 6, during operation of the computer 10 and its cooling fan 96, operating heat from the AC/DC converter 46 is conducted to and spread throughout the spreader plate 84 extending along the bottom side of the plenum 82, and the fan 96 draws ambient cooling air 106 inwardly through the air inlet openings 88 and into the plenum 82. A first portion 106a of air 106 entering the plenum 82 is caused to sweep along the plenum 82, the PCMCIA card bay structure 50, and along the bottom side of the circuit board portion 64a and the lower processor heat sink 78 thereon before being discharged through the lower discharge openings 100b via a lower portion of the fan 96. A second portion 106b of the entering air 106 is drawn upwardly through the gap 90 (see FIG. 5), to above the top side of the circuit board portion 64a, and is then drawn along the top side of the circuit board portion 64a and along the top processor heat sink 76 before being discharged through the upper discharge openings 100a (see FIG. 5) via an upper portion of the fan 96.

In this manner, plenum heat from the components therein and the heat spreader plate 84 and a first portion of the processor heat are transferred to a first portion of the cooling air traversing interior of the base housing 12, and a second portion of the processor heat is transferred to a second portion of the cooling traversing the interior of the base housing.

Figure 8:
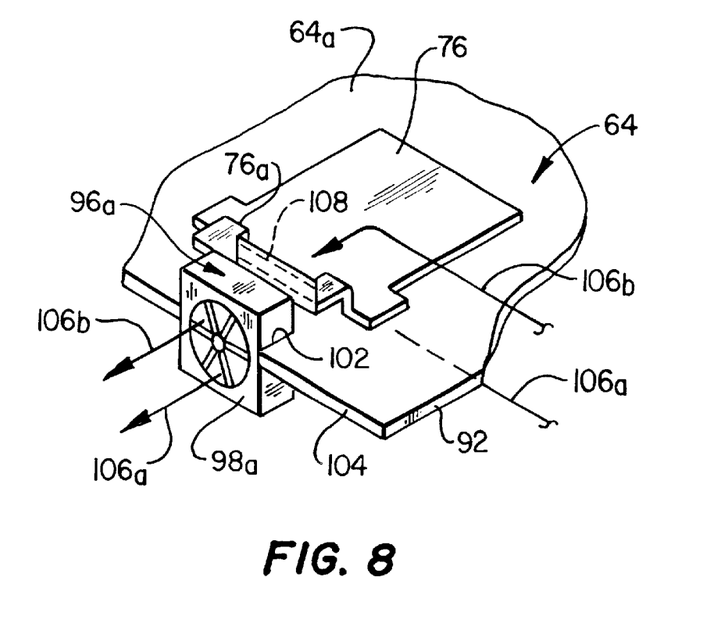
FIG. 8 is a perspective view of an alternate embodiment of the heat sink and cooling fan portion of the circuit board shown in FIG. 6.

A left real corner portion 64a of an alternate embodiment of the circuit board 64 is shown in FIG. 8 and has a higher speed processor (not shown) beneath its top aluminum heat sink member 76. To handle the higher operating heat of this higher speed processor, an axial fan 96a, having an aluminum body 98a, is substituted for the previously described axial fan 96, and an upwardly and forwardly extending front end projection 76a is formed on the top heat sink 76 and conductively secured to a top rear edge portion of the aluminum fan body 98a. During operation of the fan 96a, the upper cooling air flow 106b is directed across the top side of the circuit board portion 64a, across the top heat sink member 76, through an opening 108 formed in the heat sink extension 76a, and outwardly through an upper portion of the fan 96a for discharge through the top air discharge openings 100a (see FIG. 5) in the rear side wall of the top base housing section 12a. As can be seen, in addition to the convective heat transfer from the heat sink 76 to the cooling air flow 106b, the heat sink extension 76a also conducts heat from the heat sink 76 directly to the aluminum fan body 98a for dissipation therefrom to ambient.

As can be seen from the foregoing, the unique positioning and arrangement of the various computer components within the base housing 12 permits the illustrated three drive units and AC/DC converter (as well as the other illustrated components) to be internally disposed within the base housing.

Additionally, the close grouping of the highest heat generating components, and the use of the unique cooling system 94 described above, permits the operating heat of these components to be effectively dissipated to ambient without causing overheating of any of such elements during operation of the portable notebook computer 10.

The foregoing detailed description is to be clearly understood as being given by way of illustration and example only, the spirit and scope of the present invention being limited solely by the appended claims.

What is claimed is:

1. A portable computer comprising:
   a base housing having top and bottom sides;
   a display screen housing secured to said base housing for movement relative thereto between open and closed positions;
   a first drive unit;
   a second drive unit;
   a third drive unit;
   an AC/DC electrical power converter structure, wherein the first, second and third drive units and the AC/DC electrical power converter structure are mounted within the base housing;
   a circuit board horizontally disposed within the base housing, the circuit board having a processor thereon and first and second heat sink members respectively disposed on opposite first and second sides of the circuit board in thermal communication with the processor, and
   a cooling fan carried by the base housing and operative to create (1) a first flow of cooling air that passes along the first heat sink member and the AC/DC electrical power converter structure and through a first portion of the fan, and (2) a second flow of cooling air that passes along the second heat sink member and through a second portion of the fan.

2. The portable computer of claim 1 wherein the portable computer is a notebook computer.

3. The portable computer of claim 1 wherein:
   the first drive unit is a CD ROM drive,
   the second drive unit is a hard disk drive, and
   the third drive unit is a floppy disk drive.

4. The portable computer of claim 1 wherein the first and second drive units are disposed in a vertically stacked relationship within the base housing.

5. The portable computer of claim 4 wherein:
   the first drive unit is a CD ROM drive, and
   the second drive unit is a hard disk drive.

6. The portable computer of claim 5 wherein the hard disk drive is mounted above the CD ROM drive within the base housing.

7. The portable computer of claim 4 wherein:
   the base housing is formed from separable top and bottom sections, the top section including:
   a well adapted to receive the second drive unit, further wherein the
   first drive unit is positioned in the bottom base housing section beneath the second drive unit.

8. The portable computer of claim 7 further comprising a thermally conductive heat spreader plate positioned between the first and second drive units.

9. The portable computer of claim 1 wherein the third drive unit comprises a battery.

10. The portable computer of claim 1 wherein the cooling fan is an axial fan having a horizontally oriented axis.

11. The portable computer of claim 10 wherein the first portion of the fan is positioned below the circuit board, and the second portion of the fan is positioned above the circuit board.

12. The portable computer of claim 11 wherein:
    the base housing has an exterior wall portion with first and second spaced apart series of air flow openings formed therein, and
    the fan is positioned inwardly adjacent the first series of air flow openings and is operative to discharge air outwardly therethrough while drawing air inwardly through the second series of air flow openings.

13. The portable computer of claim 1 wherein one of the first and second heat sink members is secured to the fan in a thermally conductive relationship therewith.

14. The portable computer of claim 13 wherein the one of the first and second heat sink members has a flow passage extending therethrough to the fan.

15. The portable computer of claim 14 wherein the one of the first and second heat sink members is the second heat sink member.

16. The portable computer of claim 1, wherein at least one unit of the first, second and third drive units is disposed in a cutout portion of the circuit board.

17. The portable computer of claim 16, wherein the at least one unit is vertically stacked with at least one adjacent unit of the first, second and third drive units.

18. The portable computer of claim 1, wherein the processor and at least one member of the first and second heat sink members are disposed on thermally conductive structures, which are disposed on the opposite first and second sides and extend through the circuit board.

19. The portable computer of claim 18, wherein the thermally conductive structures comprise vias.

20. The portable computer of claim 18, wherein the processor and the at least one member of the first and second heat sink members are oriented in a vertically stacked relationship about the circuit board.

21. A portable computer comprising:
    a base housing having top and bottom sides;
    a display screen housing secured to the base housing for movement relative thereto between open and closed positions;
    first and second drive units disposed within the base housing;
    a space disposed within the base housing and adapted to receive a third drive unit;
    a circuit board horizontally disposed within the base housing, the circuit board having a processor thereon and first and second heat sink members respectively disposed on opposite first and second sides of the circuit board in thermal communication with the processor, and
    a cooling fan carried by the base housing and operative to create (1) a first flow of cooling air that passes along the first heat sink member and through a first portion of the fan, and (2) a second flow of cooling air that passes along the second heat sink member and through a second portion of the fan.

22. The portable computer of claim 21 wherein the portable computer is a notebook computer.

23. The portable computer of claim 21 wherein the first drive unit is a CD ROM drive and the second drive unit is a hard disk drive.

24. The portable computer of claim 21 wherein the first and second drive units are disposed in the base housing in a vertically stacked relationship.

25. The portable computer of claim 21 wherein the space disposed within the base housing is configured to receive a floppy disk drive.

26. The portable computer of claim 21 wherein the space disposed within the base housing is configured to receive a third drive unit or a battery.

27. The portable computer of claim 21, wherein at least one unit of the first, second and third drive units is thermally coupled to a heat spreader in pneumatic communication with at least one of the first and second flows.

28. The portable computer of claim 21, wherein the space comprises a cutout portion of the circuit board adapted to receive the third drive unit.

29. The portable computer of claim 21, wherein the processor and at least one member of the first and second heat sink members are disposed on thermally conductive structures, which are disposed on the opposite first and second sides and extend through the circuit board.

30. A portable computer comprising:
  a plurality of housing structures rotatably coupled together and configured to house computer components, the computer components comprising:
  a circuit board;
  a processor module;
  a plurality of drive modules;
  an AC/DC converter module;
  a fan configured for providing a pneumatic flow path extending from the fan across opposite sides of the circuit board; and
  a plurality of heat diffusion members coupled to at least one desired component of the computer components, wherein an associated pair of the plurality of heat diffusion members is disposed on the opposite sides in thermally conductive communication with the at least one desired component, and wherein the at least one desired component comprises the processor module.

31. The portable computer of claim 30, wherein the plurality of heat diffusion members comprise a convective heat transfer structure disposed in the pneumatic flow path.

32. The portable computer of claim 30, wherein the plurality of heat diffusion members comprise a conductive heat transfer structure configured to transfer heat from the at least one desired component to the pneumatic flow path.

33. The portable computer of claim 32, wherein the conductive heat transfer structure comprises vias extending through the circuit board.

34. The portable computer of claim 30, wherein at least one module of the plurality of drive modules is disposed in a cutout portion of the circuit board.

35. The portable computer of claim 34, wherein the at least one module is vertically stacked with at least one adjacent module of the plurality of drive modules.

* * * * *